Jan. 16, 1973     J. H. FORKNER     3,711,300
METHOD FOR PRODUCING EXPANDED FOOD PRODUCTS
Filed Nov. 3, 1969     2 Sheets-Sheet 1
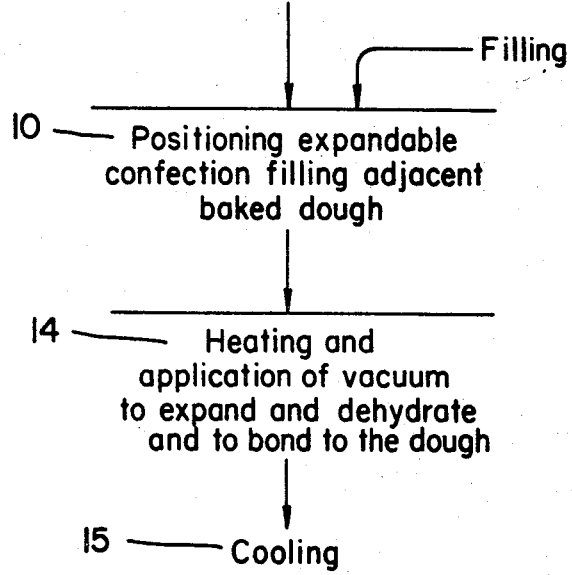
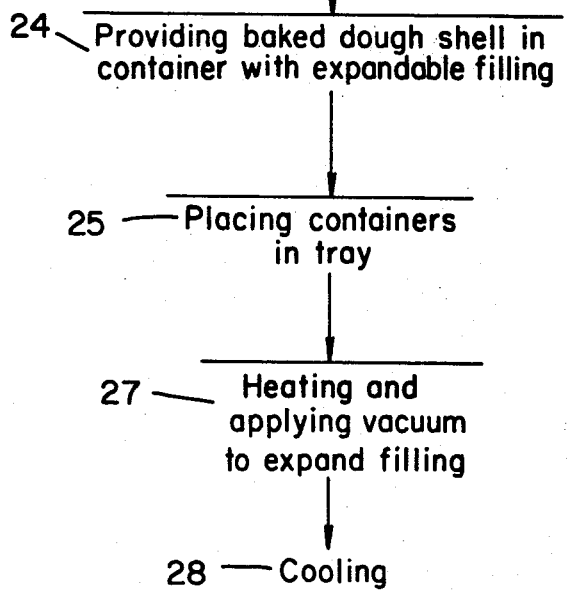
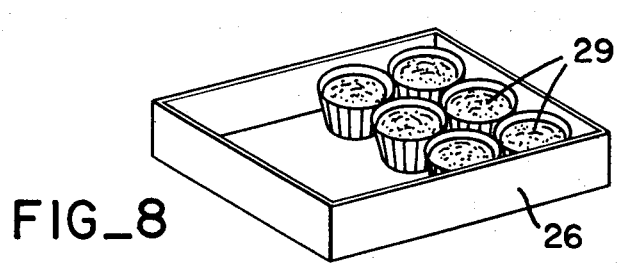
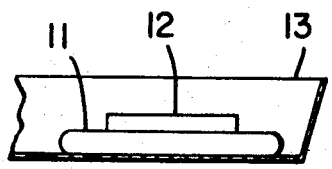
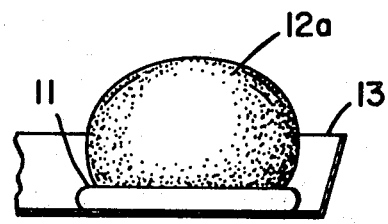
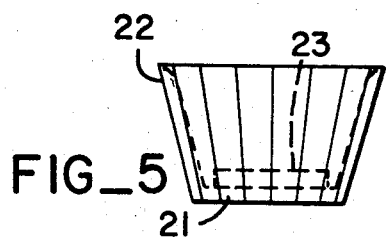
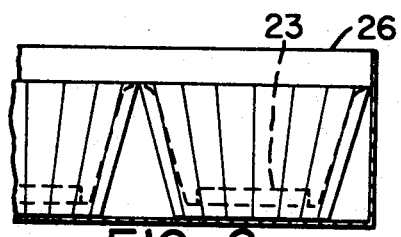
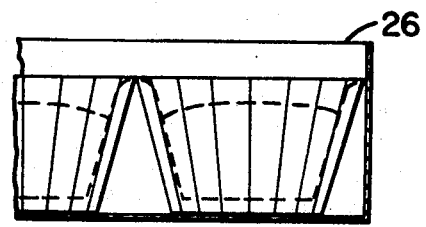

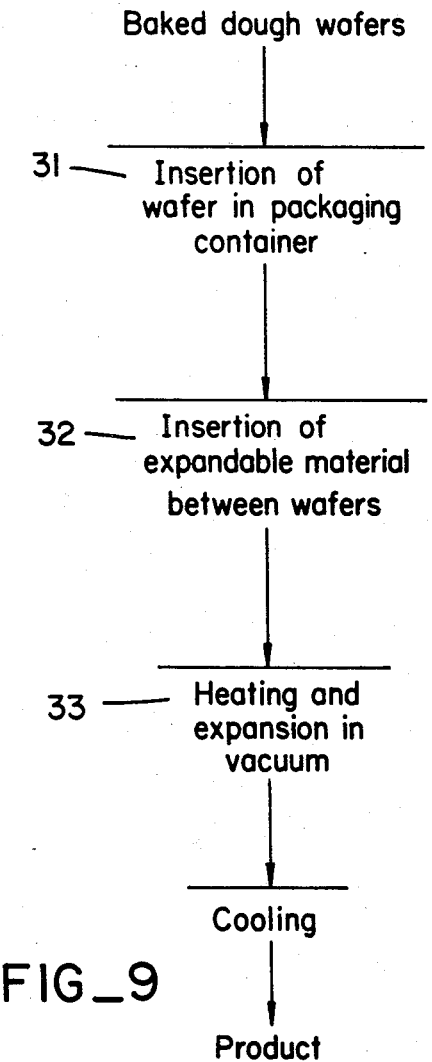
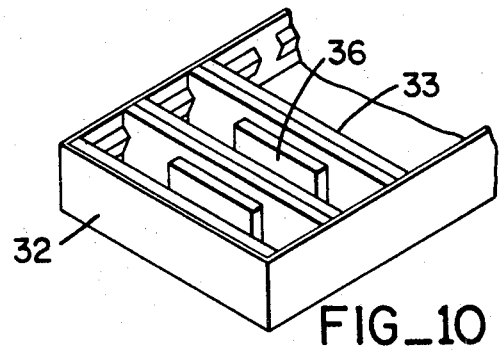
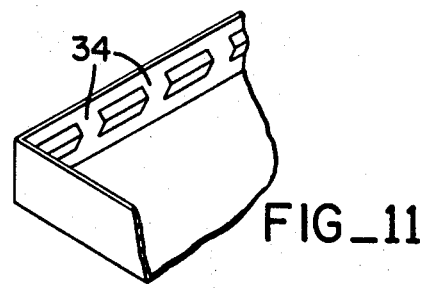
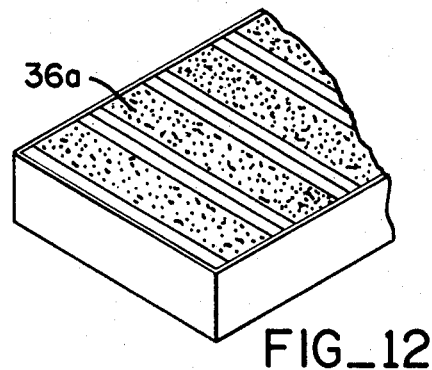
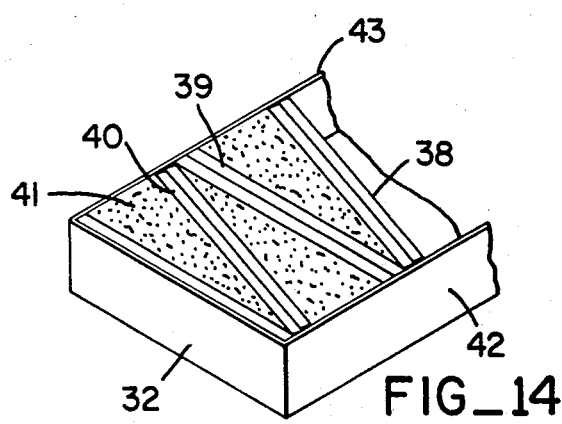
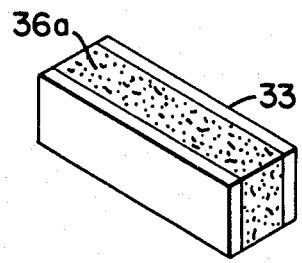

United States Patent Office 3,711,300
Patented Jan. 16, 1973

3,711,300
METHOD FOR PRODUCING EXPANDED FOOD PRODUCTS
John H. Forkner, 2116 Mayfair Drive W., Fresno, Calif. 93703
Filed Nov. 3, 1969, Ser. No. 873,262
Int. Cl. A23g 3/00
U.S. Cl. 99—138
8 Claims

ABSTRACT OF THE DISCLOSURE

A method for the manufacture of food products of the type comprising a wafer or similar member formed of cooked dough or batter (e.g., baked cooky or pastry dough), together with an expanded cellular confection filling. The filling in unexpanded form is positioned in containing means and in juxtaposition with one or more masses of cooked dough, and thereafter the dough and filling are heated to soften the filling and a partial vacuum applied to effect expansion. During heating and expansion, the filling becomes bonded to the adjacent surface or surfaces of the wafer or wafers, and the configuration of the expanded filling is determined at least in part by the configuration of the containing means.

BACKGROUND OF THE INVENTION

This invention relates generally to methods for the manufacture of composite bakery products, particularly products including a baked dough or batter, together with an expanded confection filling.

In the past, puffed or expanded confection balls have been made by subjecting a confection mix containing an expandable material (e.g., malted milk and commercial corn syrup) to heat to soften the same and to a partial vacuum whereby the volume is greatly expanded and the moisture content reduced. In my copending application Ser. No. 873,581, filed Nov. 3, 1969, now abandoned, I have disclosed a method for manufacturing products consisting of baked dough together with an expanded confection filling. A typical product made by that method is a tart having upper and lower layers of cooked dough with the expanded filling located between the same. The method in that instance involves introducing the filling in unexpanded form between layers of uncooked dough, subjecting the assembly to cooking for the purpose of cooking the dough and fusing the filling, and then subjecting the assembly while hot to a partial vacuum for expanding the entire product and dehydrating both the filling and dough. The method in that instance is effective in expanding the overall cooked dough product by baking the filling and dough simultaneously and thence expanding the filling by application of a vacuum whereby there is an overall increase in volume. It is not adapted to the manufacture of products and the special techniques required for processing prebaked doughs disclosed in the present application.

SUMMARY OF THE INVENTION AND OBJECTS

In general, it is an object of the present invention to provide a method of the above character which is adapted for use with the more conventional forms of baked items such as cookies and crackers, which are made from various bakery doughs and batters (e.g., pie dough, cooking batter).

Another object is to provide a method of the above character which locates the units in particular relative positions during processing such positions may be that which is assumed in the final packaging.

Another object of the invention is to provide a method in which packaging may precede expansion, with expansion and dehydration taking place before final sealing.

Another object is to provide a method in which the packaging material (e.g., plastic film) serves to shape the product during expansion.

Another object is to provide a method in which the expandable filling is inserted in a body of cooked dough before expansion.

Another object of the invention is to provide a method in which packaging may precede expansion, with expansion and dehydration taking place before final sealing.

BRIEF DESCRIPTION OF THE DRAWING

FIG. 1 is a flow sheet illustrating one embodiment of the method.

FIG. 2 is a detail in section illustrating how the unexpanded filling material is deposited upon a baked dough form such as a cooky or pastry shell.

FIG. 3 is a detail in section illustrating the filling in expanded condition.

FIG. 4 is a diagram illustrating another embodiment of the method.

FIG. 5 is a detail illustrating how a cooked wafer and unexpanded filling material are assembled within a container.

FIG. 6 is a detail in section illustrating container assemblies corresponding to FIG. 5 positioned within a tray.

FIG. 7 illustrates the assembly of FIG. 6 resting upon the bottom of a pan immediately after expansion of the filling.

FIG. 8 is a perspective view illustrating a complete package containing the expanded products.

FIG. 9 is another flow diagram illustrating another embodiment of the method.

FIG. 10 is a perspective view illustrating how cooked wafers can be assembled within a tray type package container with unexpanded confection filling material positioned between wafers.

FIG. 11 illustrates a type of container tray having wafer retaining means along the side walls.

FIG. 12 illustrates an assembly such as shown in FIG. 10 after expansion of the filling.

FIG. 13 illustrates one of the individual products after removal from the assembly of FIG. 12.

FIG. 14 illustrates an assembly after expansion of the filling where only certain ends of the wafers are retained.

DESCRIPTION OF THE PREFERRED EMBODIMENTS

In the simplified embodiment of the method shown in FIG. 1, a baked wafer is employed having characteristics compatible with the end product desired. This baked wafer may be any one of many types of pie shells, cookies or crackers. Such products are made from various bakery doughs and batters. In step 10 an expandable confection filling is positioned adjacent the wafer. This is illustrated in FIG. 2 where the wafer 11 is in the form of a cooky and the expandable filling material 12 is in the form of a wafer or slug. The filling material 12 is not necesarily initially attached to the upper surface of the wafer 11 because during subsequent processing an adhesive bond is formed. The assembly of wafer and expandable material 12 is shown positioned within a tray 13 which may be a metal tray used only for convenience in passing the assembly through subsequent processing operations, or preferably a tray in which the final product remains and which becomes all or a part of the final package as for example a tray made of metal foil, foil lined or wax paper, or molded plastic.

In the next step 14 the assembly of FIG. 2 is subjected to heat for the purpose of softening the filling material.

In a typical instance such heating may serve to elevate the temperature of the filling to a temperature of the order of 100 to 120° F. Thereafter, as indicated in FIG. 1, a partial vacuum as applied to cause the filling to expand substantially as illustrated in FIG. 3. Here the expanded filling is designated 12a.

The step 14 can be accomplished by use of conventional vacuum dehydrating equipment. Initially the shelf temperature of this equipment can be of the order of 180 to 240° F. to effect the initial softening of the unexpanded filling as described above. After such initial heating, a vacuum of the order of 28 to 29 inches of mercury column is applied with the shelf temperature being continued at a level of about 240° F. for about fifty minutes and then reduced to a somewhat lower temperature within the range of 150 to 80° F. for the remainder of the cycle. As will be presently explained in some instances it may be desirable to cause a partial collapsing of the filling before or after removal from the partial vacuum.

Cooling at the end of the vacuum step (e.g., to as low as 80° F.) serves to set the filling in its expanded form and this makes it possible to retain maximum expansion in the final product.

During the above heat and vacuum treatment, the filling becomes firmly bonded to the upper contacting surface of the wafer 11 and both the expanded filling and the wafer are dehydrated to a low moisture level of the order of 2% or less.

The final cooling step 15 may, as pointed out above, be carried out before releasing the vacuum, or the product in some instances may be removed from the vacuum chamber and thereafter cooled to ambient room temperature. As previously mentioned, the tray 13 may be a part of the final package, in which event the product may be packaged for marketing.

In carrying out the method in accordance with FIG. 1, it is desirable to employ means for fixing the position of each wafer 11 with respect to the tray 13 before carrying out further processing. Also, assuming that the tray 13 becomes all or a part of the final package, it is desirable that each wafer maintains a fixed position on the bottom of the tray. To effect such fixed location, I apply small amounts of viscous liquid material between the wafer and the tray which will effect initial adhesion but which will provide a friable retention after processing. A suitable material for this purpose is an expandable confection similar to the expandable filling employed but in liquid or semi-liquid form. Small amounts of such confection in liquid form can be applied to areas of the tray bottom on which the wafers 11 are deposited. It should be of sufficient viscosity (e.g., a concentration of 80 Brix) to provide the adhesion necessary to retain the cookies in place. During subsequent processing, such applications become cellular and are dehydrated, thereby forming a friable bond which is sufficient to hold the wafers in position within the tray during storage, handling and marketing, but which permits the consumer to remove the wafers and expand filling without difficulty. Instead of using a formulated confection for this purpose, I prefer to use a material like glucose syrup.

As an alternative to applying glucose or similar material as described above, a small amount (e.g., a blob) can be applied to the underside of the wafer, immediately before the wafer is deposited upon the bottom of the tray. Here again the glucose should have sufficient viscosity to retain the cookies in place. Good results have been obtained by using glucose of about 80 Brix. It may be warmed to provide a fluidity which facilitates its application, with congealing as it contacts the cooler tray.

As will be presently explained, the expandable filling 12 need not be in the form of a wafer or slug. It may be broken up to form discrete pieces or particles, and such discrete material applied to the top of the wafer 11. A single wafer or slug of expandable material tends to form a more even and uniform expanded mass such as shown in FIG. 3. On the other hand, the use of discrete particles forms a more irregular expanded form which in certain instances may be desired.

In instances where the filling material is in discrete form, it may be mixed with a variety of discrete food additives in liquid, semi-liquid or plastic form, such as cheese, chocolate, coconut, nuts, dried meats and shrimp. When such additives are mixed with the discrete expandable material, the final expanded mass consists of an agglomerate formed by the expanded pieces together with the discrete additive.

In the embodiment shown in FIGS. 4–8, the cooked dough and expandable material are first assembled within a cup-like container and thereafter the filling is expanded. Thus a baked wafer or pastry shell 21 is placed on the bottom of a container 22 and the expandable filling material 23 deposited upon the baked base. The container 22 may be in cup form, and may correspond to conventional paper, foil or parchment cups in which cupcakes are made. These operations are indicated in FIG. 4 as step 24. In step 25, the assemblies shown in FIG. 5 are placed within a tray 26 which preferably is one forming all or a part of the final package. It will be understood that instead of first forming the assembly of FIG. 5 and then inserting such assemblies into a tray as in FIG. 6, the containers may initially be placed within the tray 26 and the shells 21 and slugs 23 inserted into the same. Here again it may be desirable to fix the position of the cups within the tray, as by application of small amounts of glucose between the bottom of the tray and the bottoms of the containers. In the following step 27 the assemblies are subjected to heating and application of vacuum to soften and expand the filling material and to effect dehydration. This step can be carried out substantially in the same manner as step 14 or FIG. 1. Toward the end of the vacuum treatment or after removal from the vacuum chamber, the assemblies are cooled to ambient room temperature in step 28.

The final product produced in accordance with FIGS. 4–7 is illustrated in FIG. 8. The individual assemblies 29, including the containers 22, are designated 29 and arranged within the tray 26. Here again the tray 26 and contents may be covered or enveloped within a plastic film before marketing.

In the embodiment shown in FIGS. 9–14, baked wafers in step 31 are inserted into a packaging container substantially as shown in FIG. 10. The container 32 is in the form of a tray made of suitable material such as fiberboard, foil lined paper and the like. The cooked wafers 33 are of sufficient length to extend between the side walls of the container. Also they have a width corresponding generally to the depth of the container. The side walls of the container may be provided with retaining means such as projecting members 34 between which the end portions of the wafers are disposed, thus retaining them against movement along the length of the side walls. As shown in the FIG. 10, one wafer may be located at one end of the container, while other wafers are in pairs having their ends within the slots 34. The expandable filling material 36, which may be in the form of wafers, slugs or discrete particles is deposited between the spaced wafers. All of the foregoing is indicated in steps 31 and 32 of FIG. 9.

In step 33 the assembly shown in FIG. 10 is subjected to heating and vacuum treatment to fuse and expand the filling material. This step can be carried out substantially the same as step 14 of FIG. 1. During step 33 the filling material is first softened and then expanded under vacuum, and during expansion an effective bond is established between the expanded filling and the surfaces of the adjacent wafers. The complete expanded filling is indicated at 36a in FIG. 12. The assembly shown in FIG. 12 can be marketed without further packaging, although here again it may be covered or enveloped in a plastic film for marketing. A consumer can readily remove the separate units from the assembly of FIG. 12. Each separate unit is shown in FIG. 13 and consists of the expanded filling 36a with a cooked wafer 33 on each side. In other words, it is a sandwich, the thickness of which is dependent upon the original spacing between the wafers and the shaping dependent upon the dimensions of the container.

In the foregoing embodiments it is explained that the tray or other support member upon which the assemblies are placed for processing may be a part of a final package in which the products are marketed. Another embodiment is to enclose the assemblies with a wrapping that is complete but not completely sealed and made of material that remains intact at the temperatures to which it is heated during processing. For example the material overlying the assemblies may be metal foil or foil lined paper or one of the many moisture barrier types of plastic films used in packaging. Thus after preparing the assembly of FIG. 2 an outer plastic film wrapper can be applied, leaving one or both ends unsealed. During vacuum treatment the film may serve to limit upward expansion of the expanding filling and thus determine the shape of the final products. The filling may be dusted with starch or like material to prevent sticking to the film. After vacuum treatment and expansion the unsealed end or ends are sealed to keep the contents fresh.

Similar to the practice described above, a wrapping may be applied to the assemblies described with reference to FIGS. 4–8, and also FIGS. 9–14. Assuming that a film is applied about an assembly as in FIG. 10 but with one or both ends being left unsealed, the overlying film will again play a part in the molding or shaping of the filling.

It will be appreciated that in some instances a carton may be used as a package and may be formed or molded of a single blank which is erected to receive the cookies and expandable filling material. Thereafter the cartons my be closed without sealing and processed as previously described. After vacuum treatment the cartons may be sealed.

In some instances it may be desirable to produce a sandwich-like unit which has an expanded filling of varying thickness. Thus referring to FIG. 14, it will be seen that the wafer pairs 38, 39 and 40 extend at an angle to each other and that the expanded filling 11 is tapered or Vee-shaped. This type of final product can be obtained by fixing the ends of the wafers substantially in the position shown in FIG. 14, or by fixing only certain ends with respect to the side walls, leaving the other ends free to move as the filling expands. Thus the ends of the wafer 38 near the side wall 42 can be fixed, the ends of wafers 39 near the side wall 43 fixed, and the ends of wafer 40 near the side wall 42 fixed. This leaves the other ends of the wafers free to move, thus permitting them to assume positions under the forces applied by the expanded fillings which will results in fillings that are tapered or Vee-shaped.

In many instances it is desirable to retain maximum expansion in the final product. However, in some instances the amount of expansion in the final product may be substantially less than that attained under vacuum. Thus the formulation of the filling may be such that some subsidance takes place before it sets. Also a controlled amount of subsidiaries can be provided by reducing the vacuum before cooling. A controlled amount of subsidance can be obtained by using discrete particles of two or more expandable materials such as corn syrup and dry powdered malted milk, which has different expanding characteristics and serves to absorb moisture from the filling mix after fusion. After expanding such a mixture of particles the filling can be caused to subside a controlled amount by exposing it to a moist atmosphere. Thereafter reabsorbed moisture can be removed by simple drying. Dry non-fat milk powder also has the same moisture absorption effect when used with other expandable particles.

In instances where it is desired to produce an expanded filling which tends to resist absorption of moisture from the atmosphere, small amounts of fat can be added to formulation of the filling, preferably a hard fat having a melting point of 100° F. or higher. The fat can be added in particulate form and mixed with the expandable particles.

With respect to the composition or formulation of the expandable confection filling, it should have a substantial amount of sugar or sugar syrup which is capable of forming an expanded cellular mass when heated to an elevated temperature and subjected to a vacuum. Also the filling should be a relatively stable cellular structure after expansion, dehydration and cooling.

A number of sugars, sugar syrups and sugar containing materials have this characteristic, including commercial corn syrup (containing dextrose, maltose and dextrines), refined corn sugar (dextrose), malt syrup and malt sugar. Also malted milk which contains casein and lactose possesses the same characteristics. Mixtures of these materials can be used, as for example, commercial corn syrup containing a minor percentage of malted milk. In general, the filling may consist of 50% or more of such expandable materials. In some instances it is impractical to use a high percentage of malted milk because of its cost or because its flavor characteristics are not compatible with other desired flavors. The various expandable confection formulations disclosed in my Pat. 2,998,318 can also be employed. A wide variety of natural and artificial flavors and flavor imparting ingredients can be added, including fruit flavors, cheese, chocolate, coconut, nuts, dried products like meat and shrimp, and the like. In preparing the expandable filling, the mix can be rolled into sheets that are chilled to facilitate subdividing and handling. Thus the sheets can be chilled to a temperature of about 60° F. or lower, subdivided into masses of the desired shape and size, and then stored at a temperature below 60° F. pending their use. Also while chilled and brittle, the masses can be subdivided by grinding to form a discrete filling material. The moisture content of such a filling formulation may be of the order of about 2–10%. About 4% is deemed optimum to provide good expansion force under vacuum with good cellular structure in the expanded form.

EXAMPLE 1

Cookies were prepared using the following formula:

5 lbs. sugar
2 lbs. shortening
11 lbs. flour
12 eggs
3 lbs. liquid milk
2 oz. salt
1¼ oz. soda
½ oz. vanilla flavor
¼ oz. mace The formulation of the filling was as follows:

| | Lbs. |
|---|---|
| Dry corn sugar | 100 |
| Glucose syrup | 100 |
| Malt sugar (Diamalt) | 30 |
| Granulated sugar | 50 |
| Hard (melting point 132° F.) fat | 20 |
| Malted milk powder | 30 |
| Salt | 1 |

The above ingredients were blended together and added to the glucose after the latter had been heated to boiling temperature. During blending heat was supplied to maintain the temperature at about 160° F. This mix provided a material at about 94% solids with its moisture content being imparted mainly by the glucose content. The mix was then formed into sheets about ½" thick which were scored along lines extending at right angles to each other and 1" apart. The sheets were permitted to cool to ambient room temperature of about 70° F. whereby they became brittle. The sheets were then cooled to about 60° F. and passed through breaking rolls to cause breakage along the score lines, thereby forming wafers about 1"

square and ½" thick, each weighing about 16–18 grams. The wafers were fed from the breaker on a belt and warmed to about 100° F., after which they were passed through forming belts to produce pieces which were rounded with crowned end surfaces flattened near the center of the pieces. After cooling to about 60° F. they were sprayed with liquid hydrogenated fat having a melting point above 100° F., whereby the fat solidified as a thin film upon the exterior surfaces. A few drops of warmed glucose syrup were first deposited upon the baked cookies, and thereafter the rounded pieces were deposited upon the cookies with the glucose serving to cause adherence to prevent displacement. Foil lined paper sheets were used to line the bottoms of dryer trays. The underside of each cooky was coated with a thin strip of warm glucose syrup (about 1 gram for each cooky), and the cookies placed upon the foil lined paper, the positioning being in uniform rows, with a spacing of 1" between cookies. It was found that the glucose could be readily applied in stripes by use of a conventional kiss roller. Each of the trays was about 4" wide and 8" long. The lining paper for each tray was 4 rectangular sections, each section serving to cover ¼ of the area of a tray. These loaded trays were placed on shelves of a vacuum dryer which had been pre-heated to 240° F. After a period of about 3 to 4 minutes, the pieces of filling material had softened and fused and had attained a temperature of about 120° F. A vacuum of about 29½" mercury column was then applied and maintained throughout the expansion and drying cycle. During the first 50 minutes the shelves were held at 240° F. In the next 10 minutes the shelf temperature was reduced to 150° F., after which the vacuum was released and the trays removed. During this vacuum treatment the fused filling was greatly expanded in volume, its moisture content was reduced to about 1%, and at the end of the cycle the expanded filling had permanently set. Also it had become permanently adhered to the underlying cookie. The 4 foil liners of each tray were then removed with adhering cookies and expanded filling, and cooled to about 100° F. The liners were then sliced into strips, with each strip containing 8 cookies, after which these strips were cut to form strips each containing 4 cookies. Each strip containing 4 cookies was then placed in a packaging tray and the cookies and tray overwrapped with a moisture barrier type of plastic film. At this time the cookies remained attached to the liner strip. After several weeks storage at ambient room temperature the packages were opened and the cookies inspected. All of the cookies were found attached to the backing and it was observed that a consumer could readily separate each cooky from the backing liner because of the frangible nature of the dried glucose. The expanded filling in each instance was firmly attached to its associated cooky.

EXAMPLE 2

This example demonstrates the embodiment described in connection with FIGS. 4–8. The baked dough was a common pastry shell such as is sold in a metal foil cup. The filling was of the same formula as Example 1. After forming the filling into chilled wafer-like pieces as described in Example 1, they were subdivided while brittle to produce particles of a size which passed through a #8 screen. To a quantity of such discrete particles there was added 25% malted milk powder, 15% granulated sugar and 2% starch. The resulting mix was free flowing at ambient room temperature, although it was maintained at 65°F. to avoid possible agglomeration and to facilitate handling in scaling and depositing devices. Using a conventional scaling and filling device, 14 grams of this mix was introduced into each pastry shell and the shells were deposited into foil lined paper trays and arranged in 2 rows, each having 6 shells. Application of glucose was used to retain the shells and cups against displacement. These trays were then placed in a vacuum shelf dryer having shelves pre-heated to 240° F. In about 10 minutes the assemblies were heated sufficiently to melt the material. Some of the components of the mix, such as the sugar and confection particles, melted and tended to diffuse together, whereas the malted milk tended to remain somewhat intact in the agglomerated mass and served to absorb some of the moisture content from the other ingredients. A vacuum of 29" mercury column was maintained throughout the cycle. During a period of 50 minutes following the first 10 minutes, the shelf temperature was maintained at 240° F., and thereafter over the next 20 minutes the shelf temperature was reduced to 100° F. to cool the product, after which the vacuum was released. Thus the total treatment time in the vacuum dryer was 1 hour and 20 minutes. The trays were then wrapped with laminated plastic film capable of serving as a moisture barrier and the wrapper heat sealed. After a period of storage, the packages were opened and the contents inspected. It was noted that they had good eating properties. In one instance a chocolate pudding was applied over the filling and the product eaten after being chilled in a refrigerator. In another instance the product was added to a conventional stew mix and eaten after heating in an oven. It was found that the product was readily rehydrated by moisture from the stew mix and could be easily dispersed in the liquid content of the stew mix. This imparted an attractive appearance in which the disintegrated and dispersed filling with some entrained air formed islands or ribbons in the surface of the liquid of the mix.

EXAMPLE 3

This example demonstrates the embodiment described in connection with FIGS. 9–14. A fiberboard open tray was employed having vertical sides and ends. Along the side walls were provided with inner protrusions corresponding to protrusions 34 of FIGS. 10 and 11 for engaging the ends of the cookies. Several pairs of cookies were then introduced into the tray, with each pair of cookies having their ends retained by the protrusions. Thus provided a spacing between pairs of about 1". There were 8 pairs of the cookies in all, with single cookies being positioned against each end wall. Wafers of expandable filling were used as prepared in Example 1. One wafer was introduced into each space between the pairs of cookies. The tray and contents were then wrapped with plastic film laminate having moisture barrier properties, leaving the ends of this wrapping unsealed. The wrapping was made relatively tight and was heat sealed along longitudinal seams. These assemblies were then introduced into a vacuum oven with shelf temperature of 160° F. After the first 10 minutes, during which the expandable wafers were softened and fused, a vacuum of 29½" mercury column was applied and maintained for 1½ hours, after which the shelf temperature was gradually cooled to 120° F. to set the expanded filling. After releasing the vacuum, the assemblies were removed and the ends of the wrapping were heat sealed. An examination of each package showed that the confection filling had expanded to fill the spaces between the cooky pairs. It was evident that during expansion the filling had pressed against the wrapping film to fill the interior voids due to the fact that the interior spaces were limited and confined. After a period of storage the packages were opened and the individual sandwich-like products removed from the tray. The foregoing was repeated by using a tray without the wrapping of plastic film. It was noted that the expansion was not as uniform as with the wrapping and that all of the interior voids were not filled. In both instances it was found that the filling had become firmly attached to the adjacent cookies.

EXAMPLE 4

The formulation of the filling and the cookies employed were the same as described in Example 3. A tray was also employed but the retention of the cookies within the tray was that described in connection with FIG. 14. In other words, only one end of each pair of cookies was retained with respect to an adjacent side wall. End cookies were again positioned alongside the end walls of the tray. The same filling material as in Example 3 was applied to the spaces between the pairs of cookies. In other words, the wafer-like pieces of expandable filling material were dropped into the spaces, after which the trays were wrapped with plastic film laminate having moisture-barrier properties. The ends of the wrapping being left unsealed to permit escape of air moisture. These assemblies were then heated and vacuumized in the same manner as in Example 3. It was observed that the filling expanded and by virtue of the restraint exercised by the tray and the wrapping, the interior voids were filled. Since the pairs of cookies were anchored only at one end and alternate sides they assumed positions somewhat as illustrated in FIG. 14. In other words, V-shaped sandwiches were formed which were about 1½" thick at one end and less than 1" thick at their narrow end.

EXAMPLE 5

The filling used was the same as in Example 2 in the form of discrete particles. After blending with malted milk, granulated sugar and starch, 20 grams of this mix was deposited in each baked pastry shell and the shells placed in trays and treated in the vacuum oven. The shelves had been preheated to 240° F. There was an initial heated period of 8 minutes before application of vacuum. Vacuum of 29½" mercury column was applied and maintained for about 30 minutes, after which it was reduced to about 28½" mercury column and held at that value for the remainder of the cycle. During initial heating the mix fused to form an agglomerated mass. During the last 20 minutes of the vacuum treatment the shelf temperature was reduced to 120° F. as in Example 2. Upon removing the product from the vacuum dryer it was observed that the filling had expanded to a level above the top of the shell, but that the reduction in applied vacuum served to somewhat reduce the volume of each filling to a size less than maximum expansion. It was observed that the cell form of the expanded material was relatively uniform, and this was attributed to the presence of malted milk and starch. The partial subsidence of the expanded material during processing was observed to have created a firmer consistency but which did not interfere with eating properties. The cells were reduced in size during subsidence but remained distinct and intact. It was also observed that exposure of this product to atmospheric moisture did not tend to cause any substantial amount of further collapsing. It was found that this product could be eaten without modification, or could be combined with other materials, with or without hydration. In general it had good eating, storage and distribution properties.

EXAMPLE 6

The process was generally the same as in Example 3. However, in this instance the cookies were positioned within the tray with a spacing of about ¾" between each cooky. In other words, the cookies were not introduced into the tray in pairs. One side surface of each cooky was dusted with starch to prevent adherence of the filling. The wafer-like pieces of expandable filling material were then introduced between the cookies, the tray wrapped with a plastic film laminate without sealing the ends, and this assembly treated in a vacuum dryer in the same manner as in Example 3. After expansion it was noted that the interior voids had been filled by the expanded material. Upon inspecting the final product it was found that the filling had become adhered to one side of each cooky so that the entire mass within the package readily separated into separate items, each consisting of a cooky with a mass of expanded material adhering to one side of the same.

EXAMPLE 7

The precooked dough was of the conventional dough-nut type without a central hole (i.e., what is commonly termed a Bismark). It was fat fried and had a substantial residual fat content. While still hot following removal from the frying fat, a piece of expandable confection filling as in Example 1, weighing about 15 grams was inserted in each dough mass. This was done by thrusting the confection piece into the central portion of each soft dough mass through one side face. The dough masses with the inserted confection filling pieces were then processed as in Example 1 to expand the filling under vacuum. Some of the expanded filling remained in the dough mass and in its expansion it pressed outwardly on and enlarged the dough mass. Another expanded portion spread over the upper side of the dough. The resulting product was about twice the volume of the original fat fried dough mass. Such a product had good eating properties, with both the dough and expanded filling being crisp.

I claim:

1. A method for the manufacture of food products of the type comprising cooked dough or batter together with an expanded cellular confection filling, the steps of positioning a solidified mass of expandable confection filling adjacent a mass of cooked dough, the mass of solidified filling being positioned by first providing the cooked dough in a containing means and then placing the mass of solidified filling in the containing means adjacent to the dough, heating the dough and the filling to soften the filling and subjecting the cooked dough and softened filling to a vacuum to expand the filling, the filling being softened and expanded while within the containing means and its configuration determined at least in part by the configuration of the containing means, the heating and expansion serving to form a bond between the mass of cooked dough and the expanded filling, and then cooling the product.

2. A method as in claim 1 in which the cooked dough is in the form of wafers and in which the filling is positioned by placing the same between the dough wafers.

3. A method as in claim 1 in which the confining means is in the form of a container of predetermined configuration.

4. A method as in claim 3 in which the confining means is a container provided with a wrapper which encloses the same, the wrapper forming an unsealed enclosure during heating and expansion and serving to resist expansion of the filling against the same whereby the filling is shaped by both the configuration of the container and said wrapper.

5. A method as in claim 1 in which the confining means is a container in the form of a tray and in which the wafers are positioned to extend between the side walls of the tray.

6. A method as in claim 2 in which the confining means is a tray, the wafers extending between the side walls of the tray, at least one end of each wafer being restrained against moving relative to the adjacent side wall during expansion of the filling.

7. A method as in claim 5 in which the wafers are positioned in pairs with spaces between the pairs into which the mass of filling is introduced.

8. A method as in claim 7 in which an unsealed wrapper is applied about the tray and contents before the application of heat and vacuum to expand the filling.

References Cited

UNITED STATES PATENTS

| | | | |
|---|---|---|---|
| 3,450,538 | 6/1969 | McKown et al. | 99—83 |
| 3,366,485 | 1/1968 | Moen et al. | 99—83 |
| 3,462,276 | 8/1969 | Benson | 99—83 |
| 3,477,851 | 11/1969 | Benson et al. | 99—83 |

RAYMOND N. JONES, Primary Examiner

U.S. Cl. X.R.

99—86, 180